Feb. 7, 1928.  1,658,666
C. E. BURGENER ET AL
VARIABLE RESISTANCE DEVICE
Filed Dec. 6, 1926
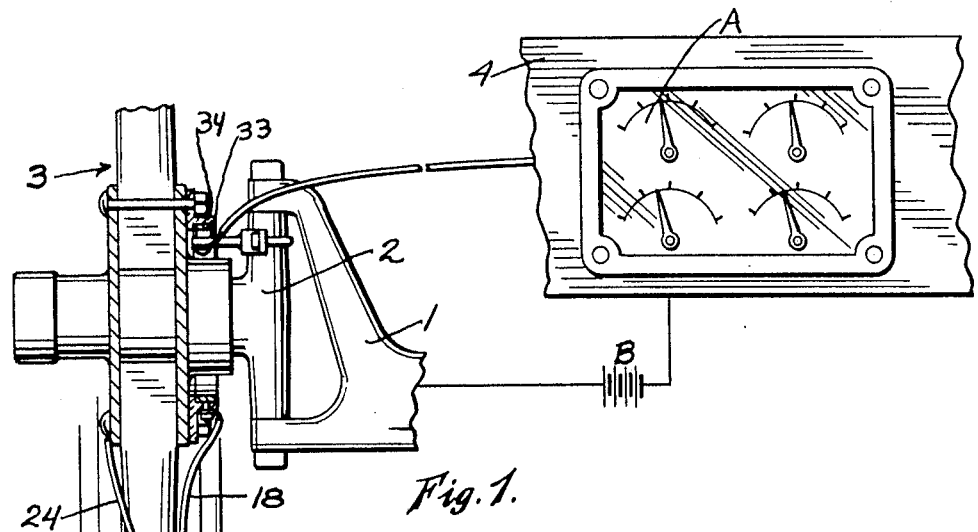
Fig. 1.
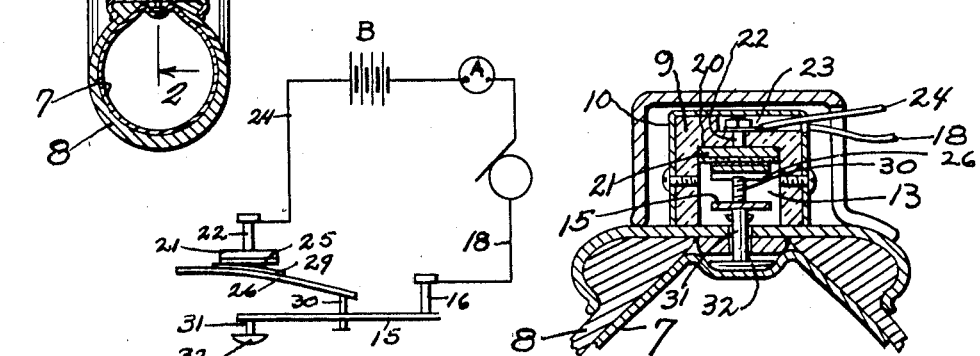
Fig. 5.   Fig. 3.
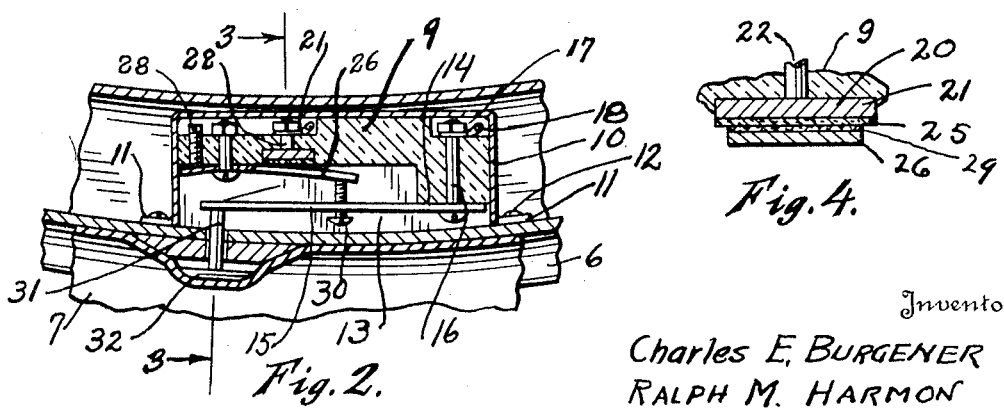
Fig. 4.
Fig. 2.
Inventors
Charles E. Burgener
Ralph M. Harmon
By  A. J. O'Brian
Attorney Patented Feb. 7, 1928.

1,658,666

UNITED STATES PATENT OFFICE.

CHARLES E. BURGENER AND RALPH M. HARMON, OF LOUISVILLE, COLORADO.

VARIABLE-RESISTANCE DEVICE.

Application filed December 3, 1926. Serial No. 152,979.

This invention relates to improvements in devices for measuring pressure and has reference more particularly to a device for determining by electrical means the air pressure in an automobile tire.

It is well known to all who are familiar with the operation of automobiles that slow leaks will frequently develop; these are nearly always due to the leaky valves or to small punctures. In making a long trip the pressures may be carefully tested and adjusted before the start is made, but due to the insidious action of the slow leak, the tire may soon become deflated to such an extent that the excessive flexure thereof will ruin it before the deflated condition is discovered.

It is the object of this invention to produce a device which will indicate the pressure in each tire independently by means of a dial and a pointer located on the instrument board where they can be seen at all times by the occupants of the machine and which therefore makes it possible for them to determine the condition of the pressure and to discover any faulty condition before damage has resulted.

Our invention can be best described and will be most readily understood when reference is had to the accompanying drawing in which the preferred embodiment has been illustrated and in which:

Fig. 1 is a view partly in section and partly in elevation showing our invention in place;

Fig. 2 is a section taken on line 2—2, Fig. 1;

Fig. 3 is a section taken on line 3—3, Fig. 2;

Fig. 4 is a fragmentary sectional view to an enlarged scale; and

Fig. 5 is a diagrammatic representation of the various elements.

Numeral 1 designates a portion of a front axle of an automobile and 2 the spindle arm to which the front wheel 3 is attached, while 4 designates the instrument board.

The wheel has the usual felloe 5 to which the demountable rim 6 is secured in the ordinary manner. The inner tube 7 and the casing 8 are of ordinary construction.

In carrying out our invention, we combine with the demountable rim, inner tube and casing, a rheostat which is so constructed and so connected and associated with the rim tube and casing that the resistance will vary inversely as the pressure in the tube 7. This rheostat is formed from a base 9 of insulating material such as fiber, hard rubber or any other suitable material. This base is preferably enclosed in a casing 10 which has one side open and whose ends are provided with outwardly extending ears 11, which are perforated for the reception of screws 12 by means of which the casing is secured to the rim 6. Base 9 has a longitudinal channel 13, provided near one end with a shoulder or elevated surface 14 to which the flat spring 15 is fastened by means of a clamping bolt 16. The end of this bolt to which the nut is applied lies in the cut out 17 and forms a terminal for the conductor 18. The flat bottom surface 19 of the channel 13 has a transverse recess 20 within which is located a metal plate 21 from one side of which a threaded pin 22 projects. This pin terminates in the cut out or recess 23 and serves as a terminal for the conductor 24. The outer surface of plate 21 is covered with a layer 25 formed from carbon and shellac. An arcuate metal spring 26 is secured with its convex side against the bottom surface 19 and held in place by means of a bolt 27. An adjusting screw 28 has a threaded connection with the body member 9 and engages the end of the spring in the manner shown in Fig. 2. The surface of spring 26 that is opposed to the surface 25 is covered with a layer 29 comprising a mixture of carbon and shellac. A screw 30 has a threaded connection with the spring 15 and engages the end of the curved spring 26. A pin 31 extends through an opening in the rim and terminates in a flat head 32 against which the outer surface of the inner tube rests. The end of pin 31 rests on the free end of spring 15. It is now evident that the force exerted by the pressure of the air within the inner tube 7 tends to move the pin 31 outwardly against the resistance of springs 15 and 26 and that these will yield an amount directly proportional to the pressure within the tube. The parts form, in effect, a spring balance whose parts assume a position of equilibrium which is different for each pressure. It is evident that when the pressure increases the movement of parts will cause the spring 26 to straighten out and that therefore a greater area of the surface 29 will come into contact with the corresponding surface 25. This increase in the contact area of surfaces 25 and 29 and the increased pressure reduces the electrical resistance and permits a greater amount of electrical current to flow from the battery B through conductors 18 and 24 to and through the ammeter A that is connected in series with the particular rheostat. The reading of the ammeter will therefore increase as the air pressure in the tire increases and its reading will therefore indicate pressure. By properly calibrating the scale of the ammeter, the readings can be made to represent the actual pressure in the tire at any time.

Since the wheels rotate and the ammeters A are stationary, it is, of course, necessary to provide a connection through which current may be conducted to the rheostat. For this purpose we have provided a ring 33 of conducting material which is secured to the wheel by means of an annular insulating ring 34. A conductor 18 is connected with this ring and conductor 24 is grounded. A brush 35 is supported from the spindle arm by suitable insulating means and contacts with the ring so as to form a slip ring contact, through which current may be transmitted to the rheostat when the wheel rotates. The slip ring connection just described is intended merely as an example of a means that can be used and it may be replaced by any other means that is suitable for the purpose.

The rheostat that has been described is constructed on the principle of the ordinary carbon pile and is intended merely as an illustration of a means, for it is evident that many specifically different constructions can be employed, the only requirement being that the resistance shall change either indirectly or directly with the pressure in the tire. Since the source of current employed is a storage battery, the voltage will be substantially constant and therefore the variations in the current will be due to the variations in the resistance only.

The amount of current flowing through ammeter A can be controlled by the addition of a constant resistance in the circuit. It is desirable to have only a small amount of current flowing through the device in order not to cause a too large drain on the storage battery.

From the above it will be apparent that we have produced an electrical pressure indicating device by means of which the pressure at any point can be used for controlling an indicator at a distant point and by means of this simple combination of elements described we have been enabled to obtain a continuous and reliable indication on the instrument board of the pressure in each of the four separate tires on an automobile.

It is evident that our device can be employed for many other uses and the one described is illustrative only.

Having thus described the invention, what we claim as new is:

1. A variable resistance device comprising, in combination, a base of insulating material, said base having a longitudinal recess in one side, an electric contact extending through the bottom of the recess, said contact having its inner end provided with a layer of carbonaceous resistance material, an arcuate spring having one end secured to the base at one side of the contact, the convex end of said spring being provided with a layer of carbonaceous resistance material, said spring being secured to the base with its convex side towards the base and means for adjusting the position of said spring.

2. A variable resistance device comprising, in combination, a base of insulating material, said base having a longitudinal recess in one side, an electric contact extending through the bottom of the recess, said contact having its inner end provided with a layer of carbonaceous resistance material, an arcuate spring having one end secured to the base at one side of the contact, the convex end of said spring being provided with a layer of carbonaceous resistance material, said spring being secured to the base with its convex side towards the base and means for straightening the spring.

3. A variable resistance device comprising, in combination, a base of insulating material, said base having a longitudinal recess in one side, an electric contact extending through the bottom of the recess, said contact having its inner end provided with a layer of carbonaceous resistance material, an arcuate spring having one end secured to the base at one side of the contact, the convex end of said spring being provided with a layer of carbonaceous resistance material, said spring being secured to the base with its convex side towards the base, means for adjusting the position of said spring and means for straightening the spring.

In testimony whereof we affix our signatures.

CHARLES E. BURGENER.
RALPH M. HARMON.